United States Patent
Toshimitsu et al.

(10) Patent No.: US 9,287,716 B2
(45) Date of Patent: Mar. 15, 2016

(54) WIRELESS POWER TRANSMISSION SYSTEM

(75) Inventors: Kiyoshi Toshimitsu, Tokyo (JP); Kohei Onizuka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 843 days.

(21) Appl. No.: 13/326,765

(22) Filed: Dec. 15, 2011

(65) Prior Publication Data
US 2012/0112555 A1 May 10, 2012

Related U.S. Application Data

(63) Continuation of application No. PCT/JP2009/004804, filed on Sep. 24, 2009.

(51) Int. Cl.
*H02J 17/00* (2006.01)
*H02J 5/00* (2006.01)

(52) U.S. Cl.
CPC *H02J 5/005* (2013.01); *H02J 17/00* (2013.01)

(58) Field of Classification Search
CPC .................................. H02J 17/00; H02J 5/005
USPC ......................................................... 307/104
See application file for complete search history.

(56) References Cited

U.S. PATENT DOCUMENTS

| 2004/0130915 A1 | 7/2004 | Baarman |
| 2004/0145342 A1* | 7/2004 | Lyon ............................. 320/108 |
| 2007/0129768 A1* | 6/2007 | He et al. .......................... 607/34 |
| 2007/0296462 A1* | 12/2007 | Hwang et al. ................... 326/82 |
| 2008/0197802 A1 | 8/2008 | Onishi |
| 2008/0231120 A1* | 9/2008 | Jin ................................. 307/104 |
| 2009/0243397 A1* | 10/2009 | Cook et al. .................... 307/104 |

(Continued)

FOREIGN PATENT DOCUMENTS

| JP | 2003-47178 | 2/2003 |
| JP | 2003-047178 | 2/2003 |

(Continued)

OTHER PUBLICATIONS

Office Action mailed Jul. 17, 2013 in counterpart Japanese Patent Application No. 2011-532787 and English translation thereof.

(Continued)

*Primary Examiner* — Jared Fureman
*Assistant Examiner* — Joel Barnett
(74) *Attorney, Agent, or Firm* — Nixon & Vanderhye, P.C.

(57) ABSTRACT

A power feeding device includes an oscillator to generate a high frequency signal, a resonance frequency determining unit configured to determine a resonance frequency to be used for a wireless power transmission, a resonance frequency controller configured to generate a resonance parameter, a resonant circuit to generate electromagnetic inductance, and a communicating unit configured to notify a resonance frequency to the power receiving device before starting a wireless power transmission. A power receiving device includes a communicating unit configured to receive information of a resonance frequency to be used for a wireless power transmission, a resonance frequency controller configured to generate a resonance parameter, a resonant circuit to generate power, a load circuit to operate by the power, a switch to open and close a connection between the resonant circuit and the load circuit, and a determining unit configured to control the switch.

11 Claims, 3 Drawing Sheets

(56) References Cited

U.S. PATENT DOCUMENTS

| | | |
|---|---|---|
| 2009/0271047 A1* | 10/2009 | Wakamatsu .................. 700/295 |
| 2009/0281678 A1* | 11/2009 | Wakamatsu .................. 700/296 |
| 2009/0284220 A1* | 11/2009 | Toncich et al. ............... 320/108 |
| 2010/0036773 A1* | 2/2010 | Bennett ........................... 705/67 |
| 2010/0063347 A1* | 3/2010 | Yomtov et al. .................. 600/17 |
| 2010/0148723 A1* | 6/2010 | Cook et al. .................... 320/108 |
| 2010/0190436 A1* | 7/2010 | Cook et al. .................... 455/41.1 |
| 2010/0210207 A1* | 8/2010 | Goto et al. .................... 455/41.1 |
| 2011/0121658 A1 | 5/2011 | Fukada |
| 2011/0298298 A1 | 12/2011 | Baarman |

FOREIGN PATENT DOCUMENTS

| | | |
|---|---|---|
| JP | 2003-319449 | 11/2003 |
| JP | 2006-517778 | 7/2006 |
| JP | 2008-206233 | 9/2008 |
| JP | 2008-295191 | 12/2008 |
| JP | 2009-261104 | 11/2009 |

OTHER PUBLICATIONS

International Search Report for PCT/JP2009/004804, mailed Feb. 9, 2010.

* cited by examiner

WIRELESS POWER TRANSMISSION SYSTEM

CROSS-REFERENCE TO RELATED APPLICATIONS

This application is a continuation application of PCT application Serial No. PCT/JP2009/004804, filed on Sep. 24, 2009, the entire contents of which are incorporated herein by reference.

FIELD

Embodiments described herein generally relate to a wireless power transmission system, a power feeding device and a power receiving device.

BACKGROUND

In wireless power transmission for performing contactless and noncontact power transmission, there is invented a wireless power transmission system that performs an authentication process between a power feeding device and a power receiving device and starts a power feeding after completing the authentication (see Japanese Patent Application Laid-Open No. 2008-295191, for example). According to a technique disclosed in Japanese Patent Application Laid-Open No. 2008-295191, there is no guarantee that after a power feeding is started, power supplied from the power feeding device to the authenticated power receiving device is continuously supplied.

Particularly, when a physical distance between the power feeding device and the power receiving device increases, there is a risk that other device receives power from the power feeding device. Further, there is also a risk that other device steals power.

DETAILED DESCRIPTION

In view of the above circumstances, an aspect of the embodiments provides a wireless power transmission system for power transmission from a power feeding device to a power receiving device by wireless.

The power feeding device comprises a determining unit configured to determine a switching pattern of a resonance frequency, containing at least a plurality of resonance frequencies and a power feeding time length of each resonance frequency, an oscillation frequency controller configured to determine an oscillation frequency based on resonance frequencies contained in the switching pattern, an oscillator to generate a high frequency signal by oscillating according to the oscillation frequency, a first resonance frequency controller configured to generate a resonance parameter based on the resonance frequency, a first resonant circuit to generate an electromagnetic wave from the high frequency signal following the resonance parameter, and a first communicating unit configured to transmit the switching pattern to the power receiving device before generating the electromagnetic wave.

The power receiving device comprises a second communicating unit configured to receive information regarding the switching pattern, a second resonance frequency controller configured to generate a resonance parameter based on a resonance frequency contained in the switching pattern, a second resonant circuit to generate power from the electromagnetic wave following the resonance parameter, a switch to open and close a connection between a load circuit to be connected and the second resonant circuit, and a judging unit configured to control the switch to connect between the resonant circuit and the load circuit upon receiving the switching pattern.

According to the aspect of the embodiments, power can be fed from a power feeding device to only a power receiving device to which power is to be supplied, and a wireless power transmission system having high power feeding efficiency can be obtained.

An embodiment is explained in detail below with reference to drawings.

Figure 1:
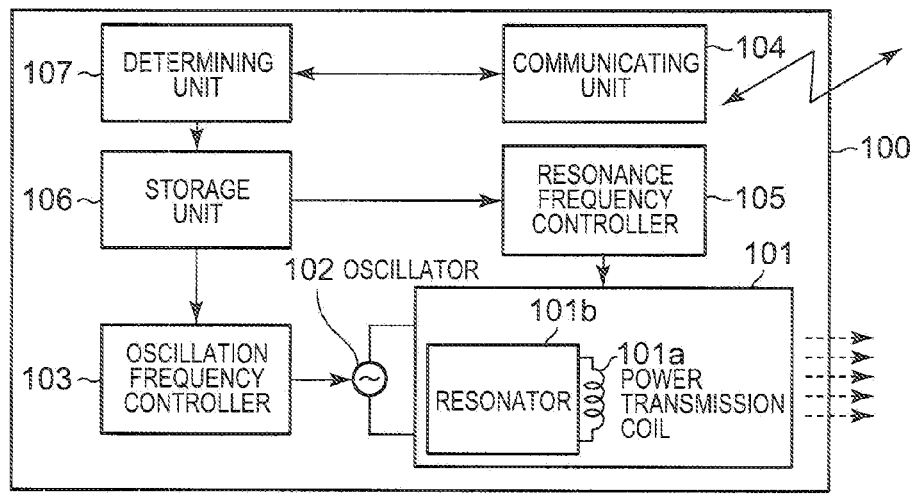
FIG. 1 is a block diagram of a power feeding device according to an embodiment of the invention.
Figure 2:
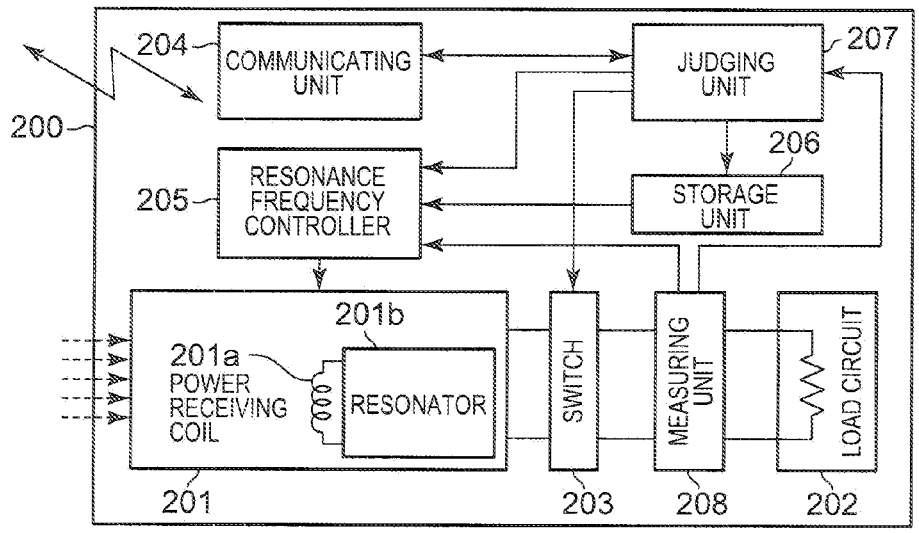
FIG. 2 is a block diagram of a power receiving device according to the embodiment.

A wireless power transmission system according to the embodiment is configured by a power feeding device shown in FIG. 1 and a power receiving device shown in FIG. 2.

A power feeding device 100 shown in FIG. 1 includes a resonant circuit 101 that generates electromagnetic induction by a high frequency signal, an oscillator 102 that generates a high frequency signal, an oscillation frequency controller 103 that controls an oscillation frequency of the oscillator 102, a communicating unit 104 that communicates with a power receiving device, a resonance frequency controller 105 that generates a resonance parameter to operate the resonant circuit 101 in a desired resonance frequency, a storage unit 106 that stores a switching pattern in the case of dynamically switching a resonance frequency, and a determining unit 107 that determines a switching pattern. The resonant circuit 101 is configured by a power transmission coil 101a as a power feeding element, and a resonator 101b. The storage unit 106 can be included in the determining unit 107.

A high frequency signal generated by the oscillator 102 is radiated as an electromagnetic wave that oscillates in a resonance frequency by the resonant circuit 101. Power is transmitted to a power receiving device 200 in FIG. 2 by the electromagnetic wave that oscillates in this resonance frequency.

The communicating unit 104 performs a communication process to perform wireless communications with the power receiving device 200 and other devices. For the communicating unit 104, communication means such as NFC (Near Field Communication), WPAN (Wireless Personal Area Network), and WLAN (Wireless Local Area Network) are assumed. However, a communicating unit is not particularly limited so far as the communicating unit can communicate with the power receiving device 200.

The determining unit 107 determines a resonance frequency to be used for a wireless power transmission. When performing a wireless power transmission by dynamically switching a resonance frequency, the determining unit 107 determines a switching pattern of the resonance frequency.

As switching patterns of a resonance frequency, there are a pattern for discretely switching a resonance frequency, and a pattern for continuously switching a resonance frequency. The pattern for discretely switching a resonance frequency contains at least plural resonance frequencies to be used, and time information for feeding power in each resonance frequency. As an example of a switching pattern, after power is fed for time t1 in a resonance frequency f1, power is fed for time t2 (t1<t2, for example) in a resonance frequency f2 (f1<f2, for example), and thereafter, the resonance frequency is switched to the resonance frequency f1 again. The resonance frequencies f1, f2, and the power feeding times t1, t2 are suitably set. Thereafter, the resonance frequencies f1 and f2 are repeated after every time of t1 and t2 in a similar manner. A switching pattern of a resonance frequency is described in detail later.

The determining unit 107 determines a switching pattern of a resonance frequency by negotiating with the power receiving device 200 via the communicating unit 104. For example, a resonance frequency and a switchable speed that can meet both the power feeding device 100 and the power receiving device 200 are sometimes different. Therefore, the determining unit 107 determines a switching pattern of a resonance frequency to be used for a wireless power transmission from among resonance frequencies that can meet both the power feeding device 100 and the power receiving device 200 by notifying a switchable resonance frequency to each other.

The determining unit 107 stores a determined resonance frequency or a determined switching pattern of a resonance frequency in the storage unit 106. Further, the determining unit 107 notifies the determined resonance frequency or the determined switching pattern of a resonance frequency to the power receiving device 200 via the communicating unit 104.

The storage unit 106 stores only one resonance frequency when a resonance frequency is not dynamically switched. The power feeding device 100 performs a wireless power transmission by using this resonance frequency. When the power feeding device 100 performs a wireless power transmission by dynamically switching plural resonance frequencies, the storage unit 106 stores a switching pattern of the plural resonance frequencies.

The oscillation frequency controller 103 determines an oscillation frequency based on the switching pattern of a resonance frequency stored in the storage unit 106, and sets this oscillation frequency to the oscillator 102. The oscillation frequency controller 103 switches the oscillation frequency following a switching pattern of a set resonance frequency. The oscillation frequency is set to the oscillator 102 each time when the oscillation frequency is switched. The oscillator 102 generates a high frequency signal following the set oscillation frequency.

The resonance frequency controller 105 generates a resonance parameter to operate the resonant circuit 101 in a desired resonance frequency based on a switching pattern of a resonance frequency stored in the storage unit 106. The oscillator 102 sets the generated resonance parameter to the resonator 101b of the resonant circuit 101.

A resonance frequency changes based on an environment in which the power feeding device 100 and the power receiving device 200 are placed. Therefore, the resonance frequency controller 105 adjusts and updates the resonance parameter based on information indicating a power receiving state notified from the power receiving device 200 via the communicating unit 104, and sets the resonance parameter to the resonator 101b to obtain a desired resonance frequency.

The resonator 101b oscillates in a desired resonance frequency following a resonance parameter set by the resonance frequency controller 105. Electromagnetic inductance is generated in the resonator 101b and the power transmission coil 101a, based on a flow of a high frequency signal from the oscillator 102. That is, the high frequency signal is radiated as an electromagnetic wave oscillating in the resonance frequency. Power is transmitted to the power receiving device 200 by the electromagnetic wave oscillating in this resonance frequency.

The power transmission coil 101a generates electromagnetic inductance by a high frequency signal with the resonator 101b, and radiates an electromagnetic wave. With this arrangement, power is transmitted to the power receiving device 200. Although FIG. 1 shows a case where a coil (the power transmission coil 101a) is used as a power feeding element, the power feeding element is not necessarily required to be a coil. For example, the power feeding element can be a dielectric disk, a dielectric sphere, a metal sphere, a metal dielectric optical crystal, and a plasmonic metal. Similarly, a type of the coil can be various such as a capacitance loading coil, and a self resonant conductive coil.

FIG. 2 shows a configuration of the power receiving device according to the embodiment. The power receiving device 200 includes a resonant circuit 201 that generates electromagnetic inductance by an electromagnetic wave from the power feeding device 100, a load circuit 202 to which power is to be supplied, a switch 203 that starts/stops a power supply to the load circuit 202, a communicating unit 204 that communicates with the power feeding device 100, a resonance frequency controller 205 that generates a resonance parameter to operate the resonant circuit 201 in a desired resonance frequency, a storage unit 206 that stores a switching pattern in the case of dynamically switching a resonance frequency, a judging unit 207 that judges a change of a resonance frequency based on a power receiving state, and a measuring unit 208 that measures the power receiving state. The measuring unit 208 is provided between the switch 203 and the load circuit 202. The measuring unit 208 may be provided within the load circuit 202. The resonant circuit 201 is configured by a power receiving coil 201a as a power receiving element, and a resonator 201b. The storage unit 206 may be included in the judging unit 207.

The resonant circuit 201 operates in a resonance frequency following a resonance parameter set by the resonance frequency controller 205. The resonant circuit 201 generates electromagnetic inductance by being electromagnetically coupled with the resonant circuit 101 of the power feeding device 100 by an electromagnetic wave oscillating in the resonance frequency.

The power receiving coil 201a receives an electromagnetic wave from the power feeding device 100. Although FIG. 2 shows a case where a coil (the power receiving coil 201a) is used as a power receiving element, the power receiving element is not necessarily required to be a coil. For example, the power receiving element may be a dielectric disk, a dielectric sphere, a metal sphere, a metal dielectric optical crystal, and a plasmonic metal. Similarly, a type of the coil can be various such as a capacitance loading coil, and a self resonant conductive coil.

A resonance frequency following a resonance parameter from the resonance frequency controller 205 is set to the resonator 201b. The resonator 201b generates electromagnetic inductance by an electromagnetic wave with the power receiving coil 201a. With this arrangement, an induction current occurs and the current flows to the load circuit 202 via the switch 203.

The switch 203 connects/disconnects between the resonant circuit 201 and the load circuit 202. A current supply to the load circuit 202 is carried out/stopped by switching the switch 203. The switch 203 is controlled by the judging unit 207. During a power reception, the resonant circuit 201 and the load circuit 202 are connected to each other by the switch 203.

The load circuit 202 operates by power (a current) received. That is, the load circuit 202 is a device to which power is to be supplied. As a simple example, the load circuit 202 is an electric bulb. The load circuit 202 can be also a motor, a heating unit, or other light emitting unit.

The measuring unit 208 recognizes a power reception start by measuring power, a current, a voltage, an impedance, etc. of the resonant circuit 201. The measuring unit 208 notifies a power reception start to the resonance frequency controller 205 upon recognizing the power reception start. The measuring unit 208 also measures a power receiving state in the resonant circuit 201 and notifies information indicating this power receiving state to the judging unit 207.

The judging unit 207 judges whether it is necessary to change the switching pattern of a resonance frequency based on the information indicating a power receiving state notified from the measuring unit 208. For example, the judging unit 207 compares the information indicating a power receiving state (a power receiving amount, for example) notified from the measuring unit 208 with a predetermined threshold value. When the power receiving amount is smaller than the threshold value, the judging unit 207 decides that the power receiving state is poor and judges that it is necessary to switch the resonance frequency. In this case, the judging unit 207 transmits a switching request of a resonance frequency to the power feeding device 100 via the communicating unit 204.

The judging unit 207 also controls the switch 203. The judging unit 207 keeps the switch 203 open until the judging unit 207 judges that "power is going to be received from now on" to disconnect between the resonant circuit 201 and the load circuit 202. The judging unit 207 closes the switch 203 after judging that "power is going to be received from now on". Consequently, the resonant circuit 201 and the load circuit 202 are connected to each other to be ready for a power reception. With this arrangement, an unnecessary power feeding and affecting power receiving performance of other device can be avoided. At the same time, the judging unit 207 notifies a power reception wait instruction to the resonance frequency controller 205 upon judging that "power is going to be received from now on". This is because the power receiving device 200 is waiting for a power reception by setting a resonance frequency to a specific resonance frequency (hereinafter, "first resonance frequency fa") until actually starting a power reception, even in the case of dynamically switching the resonance frequency.

The judgment that "power is going to be received from now on" is performed based on communications with the power feeding device 100 via the communicating unit 204. For example, the judging unit 207 judges that "power is going to be received from now on" when an authentication procedure with the power feeding device 100 is completed or when power feeding information is received.

Further, the judging unit 207 stores the resonance frequency or the switching pattern of a resonance frequency notified from the power feeding device 100 via the communicating unit 204 into the storage unit 206.

The storage unit 206 stores only one resonance frequency in the case of not dynamically switching a resonance frequency. The storage unit 206 stores a switching pattern of a resonance frequency in the case of dynamically switching plural resonance frequencies. The first resonance frequency fa used to wait for a power reception is also stored in the storage unit 206.

The resonance frequency controller 205 generates a resonance parameter to operate the resonator 201b in a desired resonance frequency based on a resonance frequency or the switching pattern of a resonance frequency stored in the storage unit 206. The resonance frequency controller 205 sets a resonance frequency following the generated resonance parameter to the resonator 201b.

However, as described above, the power receiving device 200 waits for a power reception set in the first resonance frequency fa, until actually starting the power reception, even in the case of dynamically switching a resonance frequency. Therefore, when the resonance frequency controller 205 receives a power reception wait instruction from the judging unit 207, the resonance frequency controller 205 first generates a resonance parameter to operate the resonant circuit 205 in the first resonance frequency fa. Thereafter, when a power reception start is notified from the measuring unit 208, the resonance frequency controller 205 generates a resonance parameter following the switching pattern stored in the storage unit 206. As a result, a switching timing of both frequencies of the power feeding device 100 and the power receiving device 200 can be synchronized.

The communicating unit 204 performs wireless communications with the communicating unit 104 of the power feeding device 100. However, the communicating device 204 is also used to perform wireless communications with other devices. For the communicating unit 204, communication means such as NFC, WPAN, and WLAN are used. However, a communicating unit is not particularly limited so far as the communicating unit can communicate with the power feeding device 100.

The power feeding device 100 and the power receiving device 200 explained above constitute the wireless power transmission system that transmits power from the power feeding device 100 to the power receiving device 200.

Figure 3A:
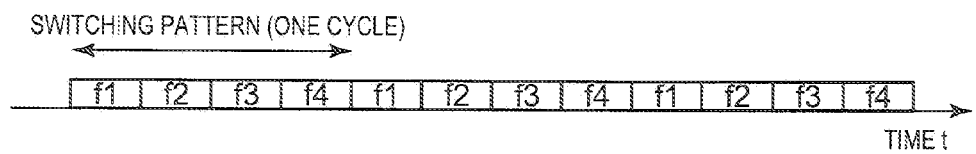
FIG. 3A shows a switching pattern example 1 in the case of discretely switching a resonance frequency.
Figure 3B:
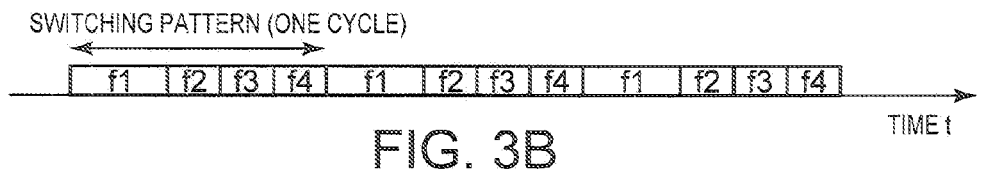
FIG. 3B shows a switching pattern example 2 in the case of discretely switching a resonance frequency.
Figure 3C:
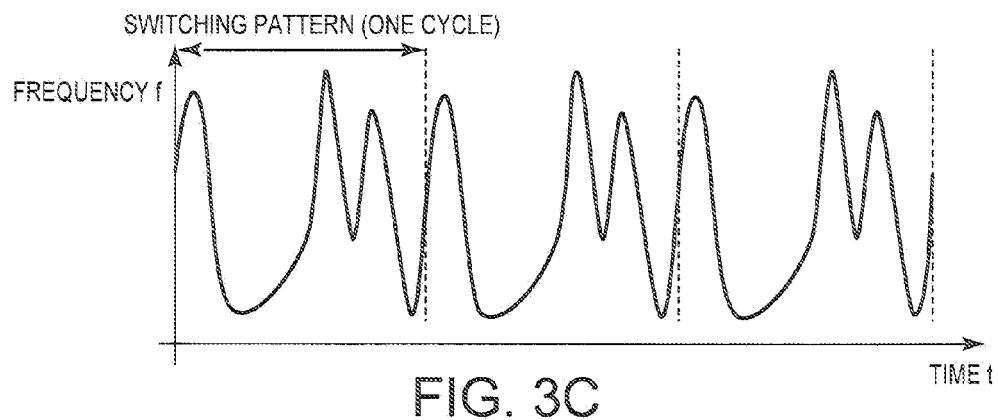
FIG. 3C shows a switching pattern example 1 in the case of continuously switching a resonance frequency.
Figure 3D:
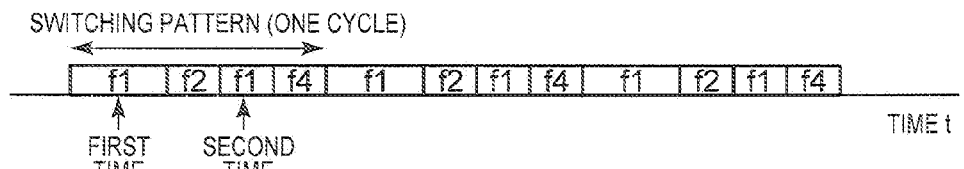
FIG. 3D shows a switching pattern example 3 in the case of discretely switching a resonance frequency.
Figure 3E:
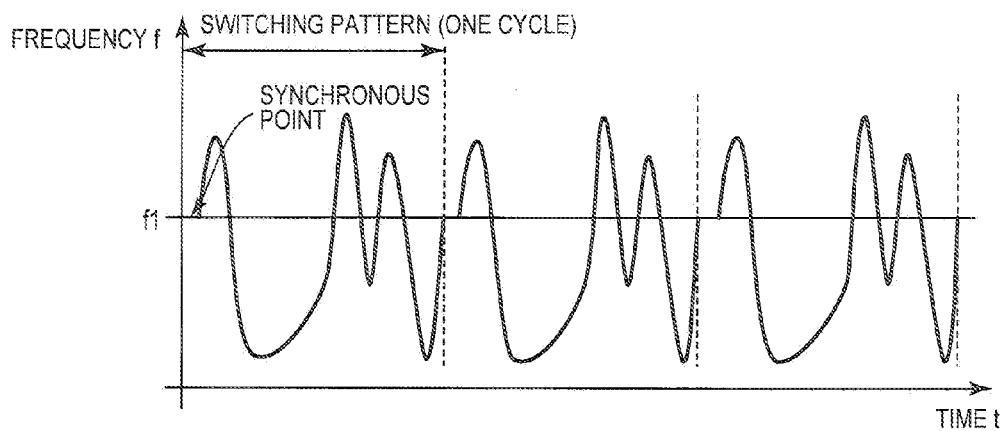
FIG. 3E shows a switching pattern example 2 in the case of continuously switching a resonance frequency.

A switching pattern of a resonance frequency is explained next with reference to FIGS. 3A to 3E. FIGS. 3A, 3B and 3D show examples of a switching pattern in the case of discretely switching a resonance frequency. FIGS. 3C and 3E show examples of a switching pattern in the case of continuously switching a resonance frequency. As shown in FIGS. 3C and 3E, in the case of continuously switching a resonance frequency, the resonance frequency is expressed by f(t) as a function of time, for example.

FIG. 3A shows an example of a switching pattern for a case where power feeding times during which each resonance frequency is used are equal. FIG. 3B shows an example of a switching pattern for a case where power feeding times during which each resonance frequency is used are different. When resonance frequencies f1, f2, f3, f4 are switched in one cycle, for example, the power feeding times can be the same as shown in FIG. 3A, or can be different, as shown in FIG. 3B. Similarly, switchable resonance frequencies are not limited to four. As shown in FIG. 3D, the same resonance frequency (the frequency f1, in this example) can be used twice or more within a switching pattern of one cycle.

On the other hand, in the case of continuously switching a resonance frequency as shown in FIG. 3C, the same resonance frequency sometimes exists twice or more within a switching pattern of one cycle.

In a discrete switching pattern or a continuous switching pattern, there is a risk that it is not possible to judge to which resonance frequency the current resonance frequency shifts next, when the same resonance frequency is used twice or more within a switching pattern of one cycle. For example, in the case of switching a resonance frequency in the order of f1 (a first time)→f2→f1 (a second time)→f4, when a first-time power feeding time and a second-time power feeding time in the resonance frequency f1 are equal, it is difficult to judge whether a power feeding is performed at a first time or at a second time in the switching pattern. As a result, there is a possibility of making an erroneous decision about to which one of the resonance frequencies f2 and f4 the current resonance frequency f1 is to be switched next. Therefore, a method of providing a characteristic to a switching pattern of a resonance frequency is proposed.

Specifically, in the switching pattern of a resonance frequency, a power feeding time that becomes a synchronous point is differentiated from other power feeding times. For example, when it is desired to synchronize at a head of a switching pattern, a first-time power feeding time in the resonance frequency f1 is set different from a second-time power feeding time in the resonance frequency f1. In this case, synchronization can be performed in the resonance frequency f1 (the first time) having a long power feeding time or synchronization can be performed in the resonance frequency f1 (the second time) having a short power feeding time. At which timing synchronization is to be performed can be notified from the power feeding device 100 to the power receiving device 200 before starting a power feeding. However, in the case of using the same frequency f1 at plural times within one cycle, it is preferable to perform synchronization in a long power feeding time from the aspect of efficiency.

In the case of continuously changing a resonance frequency as shown in FIG. 3E, power feeding times in the resonance frequency f1 that appears twice or more within a switching pattern of one cycle are also set different. That is, in the case of using the same resonance frequency at plural times in one cycle when generating a switching pattern of a resonance frequency, a difference is set between a first-time power feeding time and a second-time power feeding time, or a third-time power feeding time. With this arrangement, the power receiving device 200 and the power feeding device 100 can be easily synchronized, even when the same resonance frequency is used at plural times in one cycle.

An operation procedure of a wireless power transmission between the power feeding device 100 and the power receiving device 200 is explained next with reference to FIG. 4.

First, the power receiving device 200 transmits a power feeding request 401 to the power feeding device 100 by using the communicating unit 204. After the power feeding device 100 receives the power feeding request 401 by the communicating unit 104, the power feeding device 100 performs a predetermined authentication procedure 402, when device authentication of the power receiving device 200 is necessary. Because the invention does not limit the authentication procedure to a specific procedure, a detailed explanation of the authentication procedure is omitted. Wireless communications between the communicating unit 104 of the power feeding device 100 and the communicating unit 204 of the power receiving device 200 are expressed as wireless communications between the power feeding device 100 and the power receiving device 200.

After completing the authentication procedure 402 (after transmitting the power feeding request 401 when the authentication procedure 402 is not performed), the judging unit 207 of the power receiving device 200 notifies capability information 403 concerning a power receiving capacity of the own device from the power receiving device 200 to the power feeding device 100. The capability information 403 of the power receiving device 200 contains a resonance frequency that can be used for a power reception, a switching speed of a resonance frequency, information concerning a configuration of the resonator 201b, information concerning a characteristic of the load circuit 202, etc. In the case of discretely switching a resonance frequency as a resonance frequency that can be used for a power reception, for example, the resonance frequencies f1, f2, f3, f4, . . . can be notified to the power feeding device 100 by sequentially arranging these resonance frequencies. When a discrete value is uniquely determined, a range of a resonance frequency f0 to a resonance frequency fi can be notified to the power feeding device 100. On the other hand, when a resonance frequency is to be continuously switched, a switchable resonance frequency range f0 to fj can be notified to the power feeding device 100.

When a specific identifier is defined in a combination of resonance frequencies or a frequency range that is supported, this identifier can be notified to the power feeding device 100 as a usable resonance frequency. For example, that the resonance frequencies f0, f1, f2 are supported can be substituted by an identifier F0, and a resonance frequency range fi to fj can be substituted by an identifier FWi. Further, in the case of dynamically switching a resonance frequency, whether the switching corresponds to one of a discrete switching and a continuous switching or the switching corresponds to both a discrete switching and a continuous switching is notified to the power feeding device 100 by containing this information in the capability information 403. Similarly, in the case of performing encryption by the communicating unit 204, a capacity of a supported encryption algorithm can be also notified to the power feeding device 100 by including this information in the capability information 403.

The power feeding device 100 receives the capability information 403 from the power receiving device 200. The determining unit 107 of the power feeding device 100 determines whether to perform a power feeding or not, based on the capability information of the own device and the capability information 403 of the power receiving device 200. Instead of the determining unit 107, a separate controller or a managing unit that is separately provided may also perform the operation.

When the determining unit judges to perform a power feeding, the determining unit 107 notifies a judgment result 404 from the power feeding device 100 to the power receiving device 200. The judgment result 404 is notified to the power receiving device 200 together with power feeding information such as a resonance frequency to be used for a power feeding and an oscillation frequency switching pattern in the case of dynamically switching a resonance frequency. Further, information concerning an encryption key when performing encrypted communications by using the communicating unit 104 can be also notified to the power receiving device 200 together with the judgment result 404.

When an SIM card (Subscriber Identity Module Card) is loaded in each of the power feeding device 100 and the power receiving device 200 and also when EAP-SIM (Extensible Authentication Protection—SIM) is applied, encrypted communications can be performed with each other without using an encryption key. In this case, transmission and reception of information following a processing procedure of EAP-SIM becomes necessary. In the embodiment, transmission and reception of information to perform the encrypted communications are also regarded as transmission and reception of information concerning encryption.

After the power feeding information is notified from the power feeding device 100 to the power receiving device 200 in this way, the power feeding device 100 starts a power feeding 405 from the resonant circuit 101 of the power feeding device 100 to the resonant circuit 210 of the power receiving device 200 following the notified power feeding information.

On the other hand, the judging unit 207 of the power receiving device 200 decides whether a power feeding is started, and controls the switch 203. The determining unit 207 of the power receiving device 200 decides that a power feeding is received from the power feeding device 100, when the above authentication procedure 402 finishes normally. The judging unit 207 may decide that a power feeding is received when power feeding information is normally obtained by receiving the judgment result 404.

Figure 4:
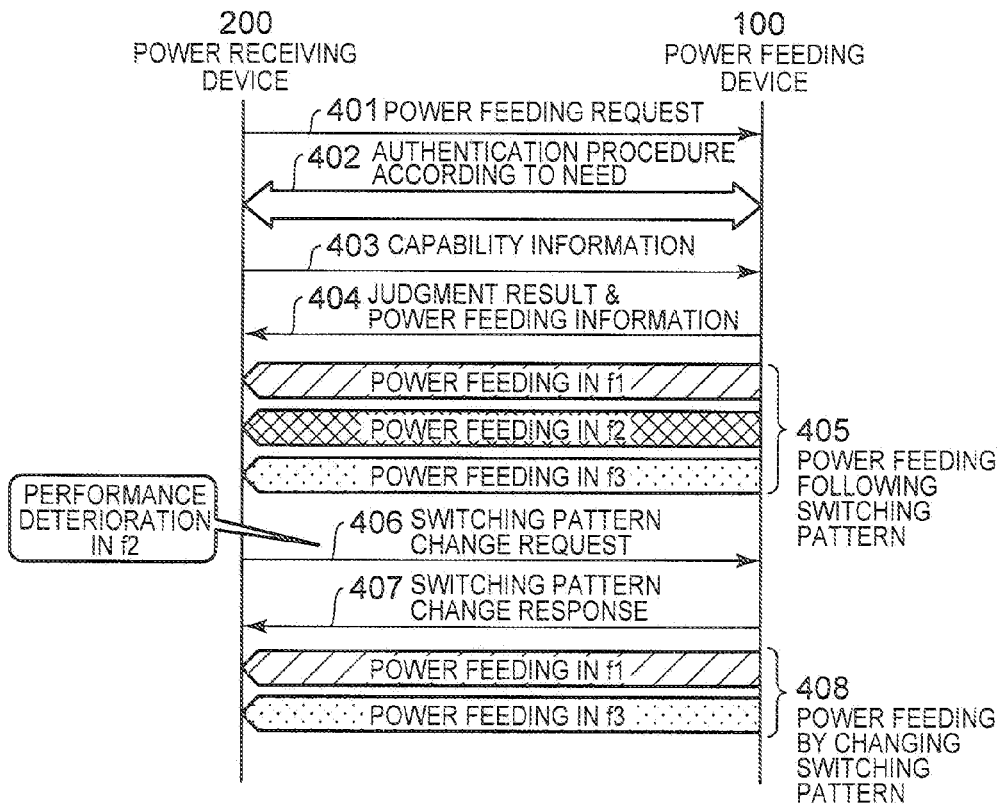
FIG. 4 is a sequence chart between a power feeding device and a power receiving device according to the embodiment.

FIG. 4 shows an example of a case where power is fed by discretely and sequentially switching the resonance frequencies in the order of f1→f2→f3. The measuring unit 208 of the power receiving device 200 measures a power receiving state of each resonance frequency during a power reception. As a result of the measurement, when a power receiving amount in the resonance frequency f2 is extremely low as compared with that in the resonance frequencies f1 and f3, the measuring unit 208 decides that it is difficult to supply power in the resonance frequency f2. For example, when a difference between the power receiving amount in the resonance frequencies f1, f3 and the power receiving amount in the resonance frequency f2 is equal to or larger than a predetermined threshold value Th1, the measuring unit 208 decides that the resonance frequency f2 affects other devices. This decision can also occur when the resonance frequency f2 is being stolen. Based on this decision, the power receiving device 200 transmits a switching pattern change request 406 to the power feeding device 100. The switching pattern change request 406 may contain information indicating a power receiving state that "power receiving amount in the resonance frequency f2 is low", for example. Although a power receiving amount is used as a parameter to measure a power receiving state in this example, a current amount, a voltage value, and an impedance value can be also used for this parameter. In this case, a measurement can be performed by using any one of or a combination of a current amount, a voltage value, and an impedance value.

For example, when a difference between the power receiving amount in the resonance frequencies f1, f3 and the power receiving amount in the resonance frequency f2 is equal to or larger than a predetermined threshold value Th2 and is also smaller than Th1, the power receiving device 200 notifies a power receiving state of the resonance frequency f2 to the power feeding device 100 as the switching pattern change request 406. In this case, there is a possibility that power transmission efficiency decreases due to deterioration of a power transmission between the resonant circuit 101 of the power feeding device 100 and the resonant circuit 201 of the power receiving device 200. Therefore, a process of adjusting a resonance parameter to be set to the resonator 101b of the resonant circuit 101 and the resonator 201b of the resonant circuit 201 respectively is performed. Alternatively, a process of adjusting a resonance parameter to be set to the resonator 101b of the resonant circuit 101 or the resonator 201b of the resonant circuit 201 can be performed to meet a resonance frequency of the other device.

The determining unit 107 of the power feeding device 100 determines a resonance frequency and a switching pattern of the resonance frequency based on the information of the switching pattern change request 406 and the power receiving state notified from the power receiving device 200. The determining unit 107 notifies an updated resonance frequency and an updated switching pattern to the power receiving device 200 as a switching pattern change response 407. For example, in the case of stopping a power feeding by using the resonance frequency f2, the determining unit 107 notifies an instruction to delete the resonance frequency f2 to the power receiving device 200. The determining unit 107 may also notify a switching pattern in which the power feeding time in the resonance frequency f2 is "0" to the power receiving device 200. When notifying a switching pattern to the power receiving device 200, a method of notifying a combination of resonance frequencies by a specific identifier can be used together.

After the power feeding device 100 transmits the switching pattern change response 407, the power feeding device 100 starts a power feeding 408 to the power receiving device 200 following the updated switching pattern. As shown in FIG. 4, although the resonance frequencies f1, f2, f3 are used in the power feeding 405, a power feeding is performed by the resonance frequencies f1 and f3 without using the resonance frequency f2 in the power feeding 408.

A wireless power transmission between the power feeding device 100 and the power receiving device 200 and wireless communications via the communicating unit 104 and the communicating unit 204 can be also performed by time division. In this case, when performing wireless communications, the power feeding device 100 stops a power feeding, and transmits a polling signal to the power receiving device 200. When the power receiving device 200 receives the polling signal from the device 100, the power receiving device 200 transmits the switching pattern change request 406 described above. By performing the above operation, the power receiving device 200 can turn on a power source of the communicating unit 204 and waits for receiving the polling signal, triggered by the stop of a power feeding from the power feeding device 100. That is, because it is not necessary to always supply power to the communicating unit 204, this contributes to power saving of the communicating unit 204. The power feeding device 100 can set a transmission timing of the polling signal according to a design. Therefore, the power feeding device 100 can communicate with the power receiving device 200 at a timing that is judged as a necessary timing.

Figure 5:
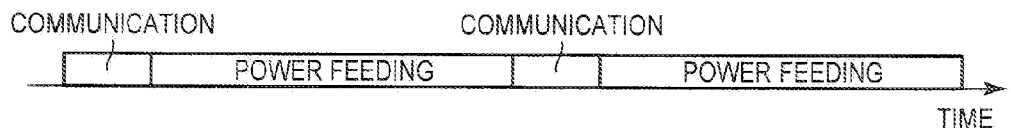
FIG. 5 shows an example of a time division frame according to the embodiment of the invention.

Another method of performing a wireless power transmission and wireless communications by time division is explained next. In performing the authentication procedure 402, the power feeding device 100 notifies in advance a configuration of a time division frame to perform a wireless power transmission and wireless communications by time division to the power receiving device 200. FIG. 5 shows a configuration example of a time division frame. By notifying in advance the configuration of a time division frame as shown in FIG. 5 to the power receiving device 200, the power receiving device 200 does not need to detect a stop of a power feeding from the power feeding device 100. Therefore, the power feeding device 200 can accept in high precision a timing of turning on the power source of the communicating unit 204.

The power receiving device 200 can change a resonance frequency and a switching pattern of the resonance frequency according to a switching pattern obtained from other device that can communicate with the communicating unit 104 of the power feeding device 100. Specifically, there is a possibility that a first device also receives an electromagnetic wave that is wireless power-transmitted from the power feeding device 100 to the power receiving device 200 and that this reception affects the first device. In this case, the first device notifies that "the first device is affected by the power feeding device 100"

to the power feeding device 100. The first device is a device that corresponds to a wireless power transmission. The first device can be a device that can perform wireless communications with the power feeding device 100. The first device can also notify the power feeding device 100 that the first device is affected by relaying this information via a separate second device. In this case, the second device and the power feeding device 100 perform wireless communications with each other by using a communication means that corresponds to the communicating unit 104. The first device and the second device can communicate with each other by a separate communication means.

The communicating unit 104 of the power feeding device 100 can have a carrier sense function. In this case, when the determining unit 108 of the power feeding device 100 receives the power feeding request 401 from the power receiving device 200 via the communicating unit 104, the communicating unit 104 performs a carrier sense. The determining unit 108 determines a resonance frequency to be used for a wireless power transmission from among frequencies (frequencies in which interference is not detected) that are not being used by other device (the first device, for example), based on carrier sense result information from the communicating unit 104. With this arrangement, when the first device is performing wireless communications by using the same frequency (or a higher harmonic wave) as the resonance frequency used for the wireless power transmission, interfering the wireless communications of the first device by the power feeding from the power feeding device 100 can be avoided.

Further, there is a possibility that a switching timing of a resonance frequency is deviated in the power feeding device 100 and the power receiving device 200 during a wireless power transmission. To cope with this situation, when a power reception characteristic becomes lower than a predetermined value, the power receiving device 200 can wait for a power reception by switching the resonance frequency to the first resonance frequency fa again. When a power reception is started again in the first resonance frequency fa, the power receiving device 200 restarts the switching of a resonance frequency following the switching pattern. With this arrangement, even when a switching timing of a resonance frequency is deviated during a wireless power transmission, it becomes possible to synchronize a switching timing of a resonance frequency in the power feeding device 100 and the power receiving device 200 again.

As described above, according to the embodiment, a resonance frequency to be used for a wireless power transmission is set between a power feeding device and a power receiving device at each time of a wireless power transmission, instead of setting the resonance frequency to a fixed frequency. By determining a resonance frequency for each wireless power transmission, power can be fed from the power feeding device to only the power receiving device.

Further, according to the embodiment, a resonance frequency is dynamically switched following a switching pattern during a wireless power transmission. Because other device positioned near the power feeding device 100 or the power receiving device 200 cannot know the switching pattern of a resonance frequency, power fed from the power feeding device 100 to the power receiving device 200 can be prevented from being received by other device. Fed power can be prevented from being stolen by other device.

Further, according to the embodiment, the power feeding device 100 can change a resonance frequency or a switching pattern of the resonance frequency, following a power feeding state or a switching pattern change request notified from the power receiving device 200 or other device. With this arrangement, affecting other device positioned near the power feeding device 100 or the power receiving device 200 can be prevented, and reduction of power receiving performance of the power receiving device 200 can be prevented.

The present invention is not limited to the above embodiment, and can be achieved by modifying a constituent element within a range not deviating from a gist of the invention. Various inventions can be formed by suitably combining plural constituent elements disclosed in the above embodiment. For example, some constituent elements may be deleted from whole constituent elements disclosed in the embodiment. Further, constituent elements in different embodiments can be suitably combined.

What is claimed is:

1. A wireless power transmission system for power transmission from a power feeding device to a power receiving device by wireless, wherein the power feeding device comprises a first transceiver that transmits and receives information to select a switching pattern from a plurality of switching patterns each containing at least a plurality of resonance frequencies and a power feeding time length of each resonance frequency, by negotiation with the power receiving device, an oscillator that generates a high frequency signal by oscillating according to an oscillation frequency determined by switching respective resonance frequencies contained in the selected switching pattern, a first resonant circuit that generates an electromagnetic wave from the high frequency signal following a resonance parameter generated based on the resonance frequencies contained in the selected switching pattern, and the power receiving device comprises a second transceiver that transmits and receives information regarding the switching pattern, by negotiation with the power feeding device, a second resonant circuit that generates power from the electromagnetic wave following the resonance parameter generated based on the resonance frequencies contained in the selected switching pattern, a switch to open and close a connection between a load circuit to be connected and the second resonant circuit, the switch being controlled to connect between the resonant circuit and the load circuit upon receiving the switching pattern, wherein the power feeding device transmits power to the power receiving device by switching the resonance parameter and the high frequency signal to be supplied to the first resonant circuit, based on the resonance frequencies contained in the switching pattern.

2. The wireless power transmission system according to claim 1, wherein the first transceiver transmits the switching pattern to the power receiving device before generating the electromagnetic wave.

3. A power feeding device that transmits power to a power receiving device by wireless, the power feeding device comprising:

a transceiver that transmits and receives information to select a switching pattern from a plurality of switching patterns each containing at least a plurality of resonance frequencies and a power feeding time length of each resonance frequency, by negotiation with the power receiving device;

an oscillator that generates a high frequency signal by oscillating according to an oscillation frequency determined by switching respective resonance frequencies contained in the selected switching pattern; and a resonant circuit that generates an electromagnetic wave from the high frequency signal following a resonance parameter generated based on the resonance frequencies contained in the selected switching pattern;

wherein the power feeding device transmits power to the power receiving device by switching the resonance parameter and the high frequency signal to be supplied to the resonant circuit, based on the resonance frequencies contained in the switching pattern.

4. The power feeding device according to claim 3, wherein the transceiver transmits a new switching pattern to the power receiving device by determining the new switching pattern, and the resonance parameter following the new switching pattern is supplied to the resonant circuit, and the oscillator outputs the high frequency signal following the new switching pattern to the resonant circuit.

5. The power feeding device according to claim 3, wherein, in the case of feeding power by using a plurality of the same resonance frequencies in at least one cycle of the switching pattern, mutually different power-feeding time lengths are set to the plurality of resonance frequencies in the switching pattern.

6. The power feeding device according to claim 3, wherein the transceiver transmits the switching pattern to the power receiving device before generating the electromagnetic wave.

7. The power feeding device according to claim 3, wherein the transceiver receives a signal indicating a power receiving state of the power receiving device, and the switching pattern is changed based on the power receiving state.

8. A power receiving device that receives power from a power feeding device by wireless, the power receiving device comprising:

a transceiver that transmits and receives information to select a switching pattern containing at least a plurality of resonance frequencies and a power feeding time length of each resonance frequency, by negotiation with the power feeding device;

a resonant circuit that generates power from an electromagnetic wave following a resonance parameter generated based on the resonance frequencies contained in the selected switching pattern; and a switch to open and close a connection between a load circuit to be connected and the resonant circuit, wherein the switch is controlled to connect between the resonant circuit and the load circuit upon receiving the switching pattern.

9. The power receiving device according to claim 8, wherein the power receiving device waits for a power reception by supplying a resonance parameter corresponding to a predetermined resonance frequency to the resonant circuit, and after starting the power reception, switches a resonance parameter to be supplied to the resonant circuit following the switching pattern.

10. The power receiving device according to claim 8, wherein a power receiving state of the resonant circuit is measured, the power receiving device notifies a signal indicating the power receiving state to the power feeding device, when a value of the power receiving state is equal to or smaller than a predetermined threshold value.

11. The power receiving device according to claim 8, wherein the power receiving state is any one of or a combination of a power receiving amount of the resonant circuit, a current amount, a voltage value, and an impedance value.

* * * * *